Figure 4:
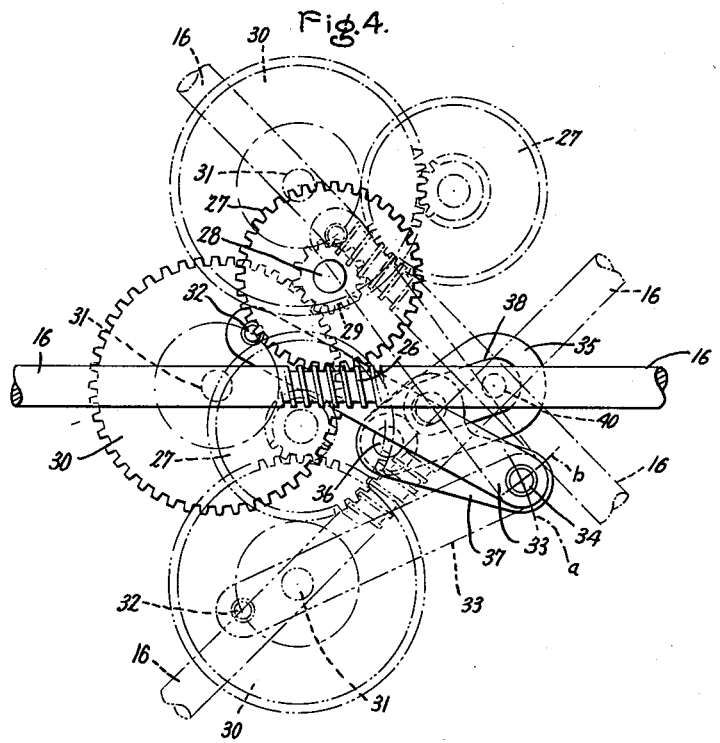

April 14, 1953
G. J. REISCH
2,634,905
ELECTRIC FAN HAVING VARIABLE OSCILLATING
MECHANISM AND CLUTCH
Filed Jan. 10, 1951
3 Sheets-Sheet 1
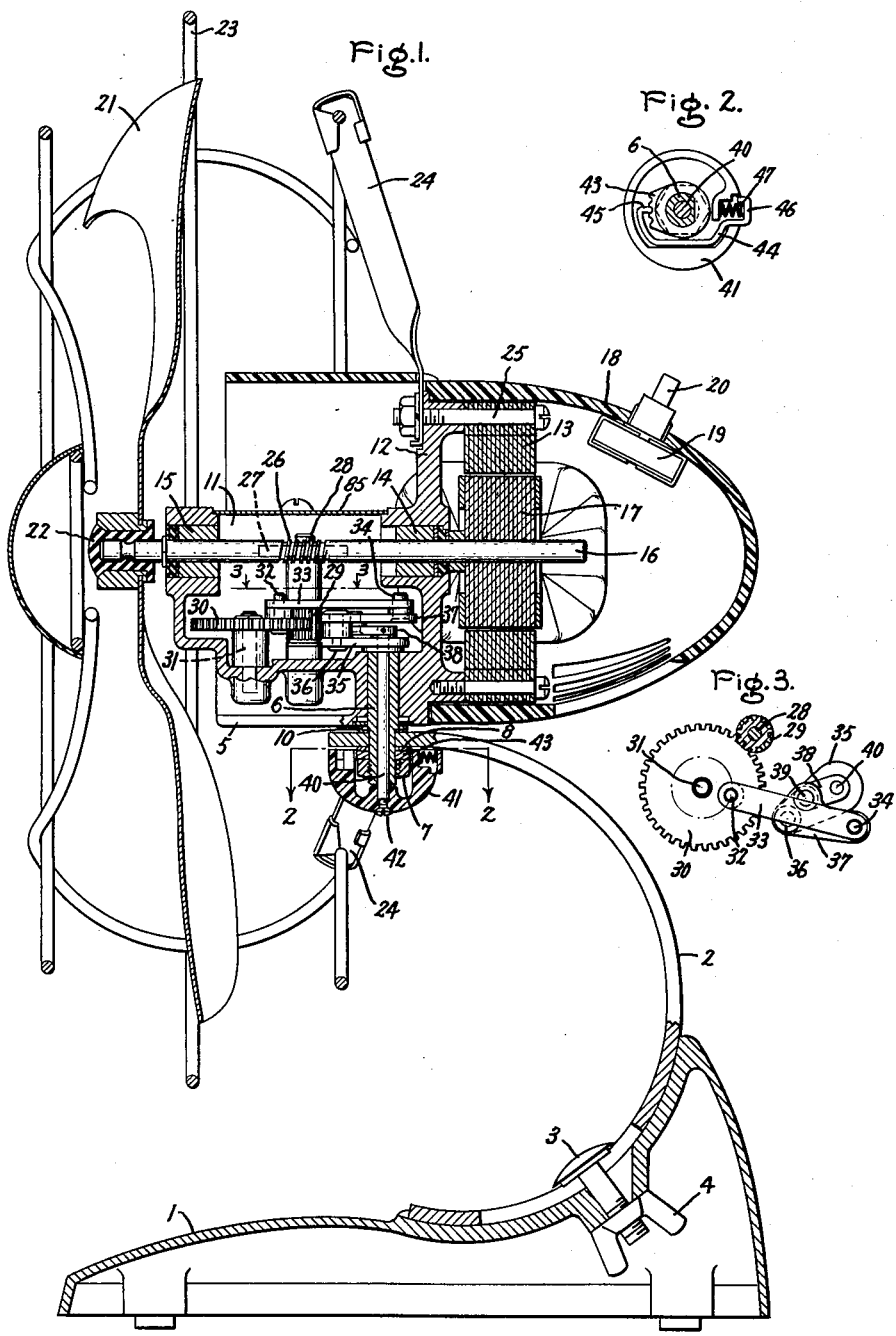
Inventor:
George J. Reisch,
by *Sheridan LeBiggs*
His Attorney.

Inventor:
George J. Reisch,
by [signature]
His Attorney.

April 14, 1953  G. J. REISCH  2,634,905
ELECTRIC FAN HAVING VARIABLE OSCILLATING
MECHANISM AND CLUTCH
Filed Jan. 10, 1951  3 Sheets-Sheet 3
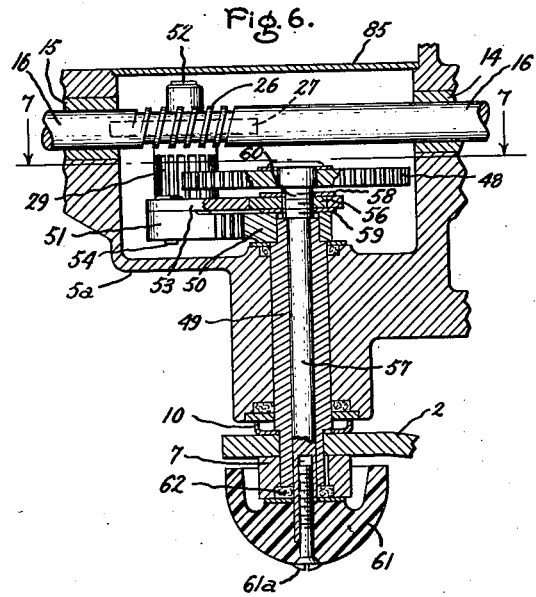
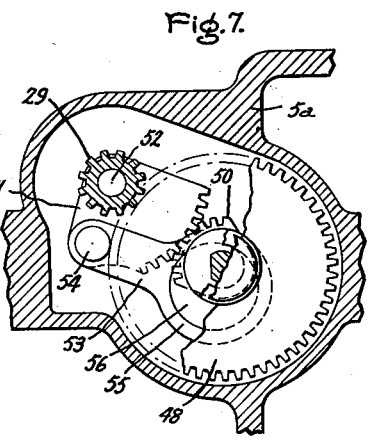
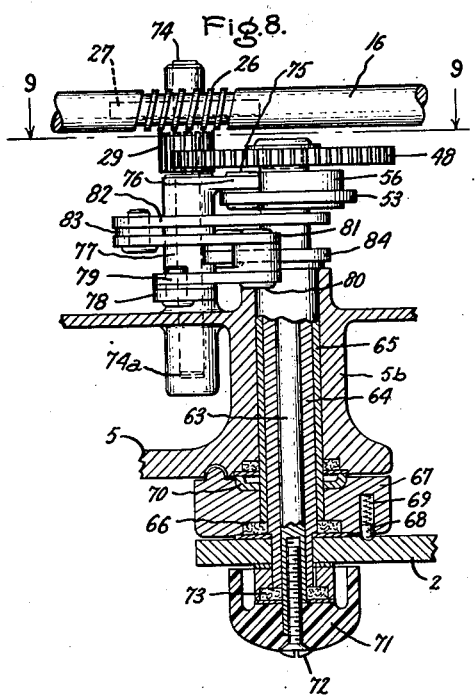
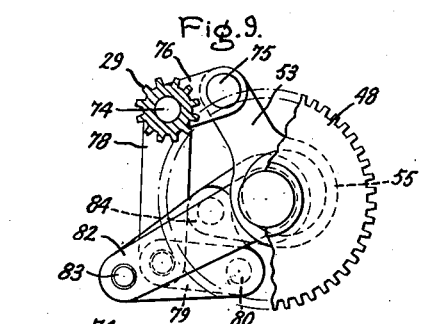
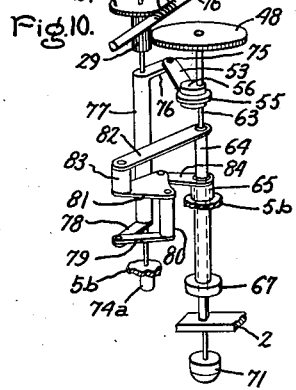
Inventor:
George J. Reisch,
by Sheridan W. Biggs
His Attorney.

Patented Apr. 14, 1953

2,634,905

UNITED STATES PATENT OFFICE 2,634,905

ELECTRIC FAN HAVING VARIABLE OSCILLATING MECHANISM AND CLUTCH

George J. Reisch, Devon, Conn., assignor to General Electric Company, a corporation of New York Application January 10, 1951, Serial No. 205,355

17 Claims. (Cl. 230—256)

| 1 | 2 |

This invention relates to electric fans, and more particularly to an improved variable oscillating mechanism, clutch and control for an oscillating fan.

An object of my invention, in connection with electric fans, is to provide an oscillating mechanism with a manual control for varying the angle of oscillation, readily and safely adjustable either when the fan is in operation or when at rest.

A further object of my invention is to construct an adjustable oscillating mechanism which will result in fan movement in equal arcs or angles either side of a given center line, such as the longitudinal center line of the fan base and support.

Another object of my invention is to provide an improved clutch for control of a variably oscillating fan mechanism, operable to oscillate or to lock the fan in any position within the maximum arc of oscillation.

A still further object of my invention is to construct an electric fan with an external adjustment facilitating manual control of the extent of oscillation or for locking the fan in a given position.

Another object of my invention is to provide a manual adjustment for varying the angle of oscillation of a fan, the manual adjustment including a control knob which does not swing back and forth in an arc during fan oscillation, but which is located concentric to the pivot of oscillation of the fan.

In accomplishment of the foregoing and other additional objectives, I provide a fan mounted on a fixed pivot axis featured by an oscillating mechanism therefor, which includes an oscillating lever having an eccentric connection to a continuously rotating gear and a pivotal connection with a manually adjustable member for varying the size of the angle of oscillation. The various positions of the manually adjustable member may be selected to vary the distance between the pivoted portion of the oscillating lever and the fan swivel axis, and in a manner to cause the center line of the fan base and support, or any other given center line, to bisect substantially the total oscillation angle, regardless of the position of the adjustable member. A further feature of my invention embodies a clutch in the oscillating mechanism to selectively control the eccentric drive of the oscillating lever. The control knob for changing the angle of oscillation and for actuating the clutch of the drive, or for doing either or both of these things, is concentric with the axis of the fixed pivot on the fan support, and therefore will not swing during fan oscillation.

Further features and objects of my invention, along with the construction and mode of operation, will be better understood from the following description taken in connection with the accompanying drawings; and its scope will be pointed out in the appended claims.

Figure 5:
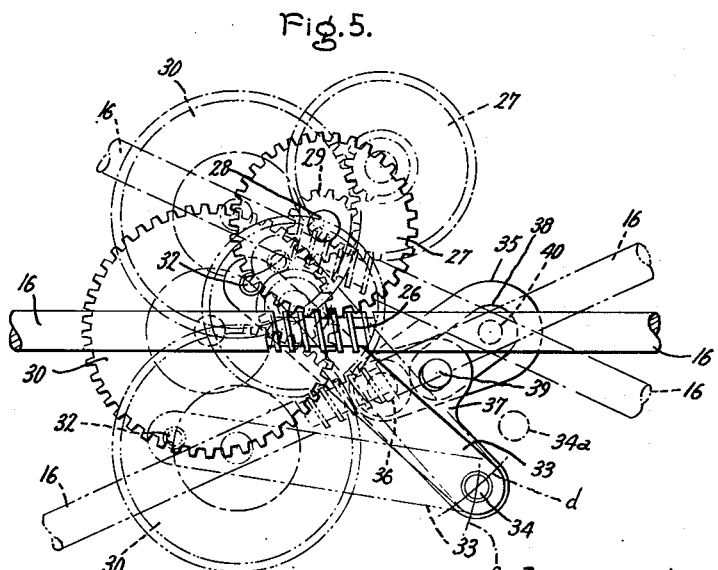

Referring to the drawings, Fig. 1 is a sectional elevation through an electric fan embodying my invention; Fig. 2 is a cross-sectional view taken on the line 2—2 of Fig. 1; Fig. 3 is a partial cross-sectional view taken on the line 3—3 of Fig. 1 of an oscillating mechanism in accordance with my invention; Figs. 4 and 5 are plan views of an oscillating mechanism constructed in accordance with my invention illustrating the cooperative relation of the various components; Fig. 6 is a partial cross-sectional view through an electric fan showing a modified form of an oscillating mechanism and clutch in accordance with my invention; Fig. 7 is a cross-sectional view taken on the line 7—7 of Fig. 6; Fig. 8 is a partial cross-sectional view of a further modified form of an oscillating mechanism and clutch in accordance with my invention; Fig. 9 is a cross-sectional view taken on the line 9—9 of Fig. 8; and Fig. 10 is a schematic view in perspective of the oscillating mechanism and clutch shown by Figs. 8 and 9.

Referring to Fig. 1 of the drawings, I have shown my invention in one form as embodied in an electric fan supported on a base 1 by a supporting arm 2 adjustably positioned with respect to the base by a bolt 3 and wing nut 4. The fan operating mechanism and motor are carried by a combined or unitary frame and gear case 5 which is oscillatably connected to supporting arm 2 by a swivel stud 6, the swivel stud being fixed to arm 2 by nut 7 and washer 8. The external surface of swivel stud 6 provides a bearing surface upon which the gear case and frame may rotate or oscillate. A thrust bearing and grease seal 10 preferably is employed at the point of connection between the gear case and support 2.

The unitary gear case and frame provides an enclosed space 11 housing the entire oscillating mechanism, and also forms a spider 12 for supporting a stator 13 of the motor and motor bearing 14. An additional bearing 15 for motor shaft 16 is mounted in the fan blade end of the gear case. Shaft 16 is driven by rotor 17 in a conventional manner. Preferably, the entire fan operating mechanim is enclosed within an outer decorative casing such as 18. A switch 19 may be mounted on this outer casing, with a switch operating member 20 external of the casing for controlling operation of the motor. The outer end of the motor shaft carries a fan blade assembly 21, including a resilient mounting hub 22 to minimize transmission of vibrations between the motor and fan blade assembly. Preferably, a mounting is used such as disclosed and claimed in the patent of William K. Skolfield, 2,558,589, filed November 17, 1948, issued June 26, 1951, and assigned to the General Electric Company, assignee of the instant application. Surrounding the fan blades is a wire guard 23 which may be supported from frame member 5 by a plurality of radial struts 24 having their outer ends connected to the guard and their inner ends bolted to frame 5. For convenience, bolts 25 may be employed for attaching motor stator 13 to the frame as well as for connecting struts 24 to the frame as shown in Fig. 1. The combined unitary gear case and frame as embodied in an electric fan is disclosed more fully and claimed in my copending application Serial No. 59,847, filed November 13, 1948, now Patent Number 2,600,325, issued June 10, 1952, and assigned to the General Electric Company, assignee of this present application.

While fan blades 21 are driven at a relatively high rate of speed, it is desirable that the fan oscillate at a much slower rate. To accomplish this speed reduction, a worm 26 is formed on shaft 16 intermediate its ends for meshing engagement with a worm gear 27 rotatable on shaft 28 projecting upwardly within the gear case. Also journaled on shaft 28 is a pinion 29 integral with worm gear 27 and having meshing engagement with a spur gear 30, which in turn is journaled on a shaft 31 secured in gear case 5. Extending upwardly from spur gear 30 and in eccentric relation to its axis of rotation is an eccentric pin 32 to which is pivotally connected an oscillating lever 33. The opposite end of this oscillating lever is journaled on a pivot pin 34, which normally is held substantially stationary during fan oscillation. Thus, when the fan is placed in operation, rotation of shaft 16 through worm 26, worm wheel 27 and pinion 29 results in rotation of spur gear 30 and likewise a rotation of pin 32 about the axis of gear 30. Since the right-hand end (Figs. 1 and 3) of oscillating lever 33 is held in a relatively fixed position by pin 34, the rotational movement of the eccentric pin 32 causes oscillation of the gear case about swivel stud 6.

At this point, it may be noted that the extent of oscillation is determined by the relative position of pivot pin 34 for the oscillating lever with respect to the axis of swivel stud 6. More specifically, if the pivot pin 34 is moved closer to the axis of the swivel stud, the fan will oscillate through a wider angle or arc; or vice versa, movement of pivot pin 34 to a more remote position with respect to the axis of the swivel stud will decrease the angle of oscillation. In accordance with this invention, I provide means for manually adjusting the relative position of pivot pin 34 with respect to the axis of the swivel stud.

Referring again to Figs. 1 and 3, a swivel stud arm 35 is rigidly affixed to the upper end of the swivel stud. Since the swivel stud is fixed or keyed to supporting arm 2, it may be noted that swivel stud arm 35 is fixed in position with respect to the supporting structure for the fan. The outer end of swivel stud arm 35 carries a pivot pin 36, such as a shouldered rivet secured thereto. Pivot pin 36 is connected rotatably to an adjustment arm 37, so that arm 37 may rotate about the axis of pin 36. The pin 34 which pivotally connects to the oscillating lever 33, is rigidly affixed to the outer end of adjusting arm 37. Hence, rotational movement of the adjusting arm about its pivotal mounting pin 36 results in relative displacement of pivot pin 34 of the oscillating lever with respect to the axis of the swivel stud. The position of adjusting arm 37 is controlled by the rotational position of a cam arm 38 carrying on its outer end a pin 39 having a lost motion connection with arm 37, whereby rotation of cam arm 38 about the swivel stud axis results in a similar rotational movement of adjusting arm 37 about the axis of pin 36. Cam arm 38 in turn is fixed to the upper end of an adjustment shaft 40 extending coaxially through the swivel stud.

From the above, it may be seen that rotation of adjustment shaft 40 changes the angle of oscillation of the fan with respect to the supporting structure. Therefore, during normal operation, it is necessary to hold shaft 40 in a fixed position; and furthermore, the relative position of this shaft should be easily adjustable from a point external to the fan. For this purpose, I secure a knob 41 to the lower end of shaft 40 by means of a screw 42 so that rotation of this knob likewise rotates shaft 40. As shown more clearly in Fig. 2, a ratchet member 43 is fixed in position by being keyed to swivel stud 6. A cooperating latch member 44 has an end portion 45 which is adapted to engage the depressions in ratchet 43. This latch 44 is slidably carried within knob 41 with a manually movable portion 46 extending outside of the knob. A spring 47 acting between the knob and latch member 44 tends to retain the latch member in engagement with the ratchet, thereby holding the knob in an adjusted position. If the operator wishes to vary the angle of oscillation, the protruding portion 46 of the latch member is pressed inwardly with respect to the knob to disengage it from the ratchet member and thus permit knob rotation. When the latch member is again released, it engages one of the notches in the ratchet member, whereby the oscillating mechanism remains in the adjusted position. While in the present embodiment, I have shown a ratchet member having three indentations, corresponding to three different angles of oscillation, obviously, any reasonable number of such positions could be provided.

As stated above, it is a feature of my invention that the fan oscillates substantially equal arcs either side of a given center line. In the present embodiment, I select as a center line the longitudinal center line of the base and supporting arm, since normally a user will orient the base in the general direction in which air movement is desired. Thereafter, whenever the fan is turned on, it will oscillate an equal angle either side of this center line. The relative arrangement of the various components of this oscillating and adjusting mechanism so that a given center line bisects the total angle of oscillation will become clear in view of Figs. 4 and 5 and the following description.

Referring now to Fig. 4, the first step in laying out this adjustable oscillating mechanism is to select suitable gears to provide the necessary speed reduction from the motor shaft to spur gear 30. Oscillating lever 33 is selected with a suitable length as required to produce the desired oscillation within a gear case of minimum dimensions. Likewise, the position of pivot pin 32 on spur gear 30 is selected to provide a smooth oscillating mechanism operable in a minimum of space. In practice, I find that the radius of operation of eccentric pin 32 should be approximately one-half of the radius of spur gear 30, although this dimension may be readily varied. As explained above, the critical point with respect to this oscillating mechanism is the position of the axis of pivot pin 34 which is carried by adjusting arm 37. My purpose, then, is to position pin 34 so that the fan will oscillate equal distances or arcs either side of a center line. In Fig. 4, I have shown the oscillating mechanism in full lines in its intermediate position in which the longitudinal axis of motor shaft 16 is in alignment with the longtudinal center line of the support and base. The dotted line positions represent the extremes of the oscillatory movement in either direction. In this example, I have selected an oscillating mechanism providing a maximum angle of 90 degrees. The first step in locating the proper position for the axis of pivot pin 34 is to lay out the known elements consisting of the gearing, oscillating lever 33, and the face frame in one of the extreme positions, for example, the lower position, as shown in Fig. 4, that is, the position corresponding to the maximum counterclockwise rotation about the axis of the swivel stud and shaft 40. Using as a center the axis of rotation of spur gear 30; an arc $a$ is struck having a radius equal to the effective length of oscillating arm 33 less the radius of action of eccentric pin 32 about axis 31. The effective length of the oscillating lever for this purpose is the length of arm 33 between the pivotal axis of eccentric pin 32 and the pivotal axis of pin 34. The fan is then moved clockwise to its other extreme position and again an arc $b$ is struck about the axis of rotation of spur gear 30, using as a radius the effective length of the oscillating lever plus the effective radius of operation of eccentric pin 32 about the axis of the spur gear. The intersection point of these two arcs $a$ and $b$ drawn as described above locates the proper position for the axis of pin 34 so that the fan will oscillate equal angles, in this instance 45 degrees, in either direction from the longitudinal center line of the base. This layout, then, will always result in the longitudinal center line bisecting the total angle of oscillation when the mechanism is adjusted for the maximum angle of oscillation.

In Fig. 5, I have shown a layout for again locating the position of the axis of pivot pin 34 for the fan when it is operating with a minimum angle of oscillation, for example, 50 degrees. Again, an arc is struck using as a center the axis of rotation of spur gear 30 and as a radius the effective length of oscillating lever 33 less the effective radius of eccentric pin 32 with respect to the center of the spur gear. This operation is performed at each extreme of the oscillatory movement of the fan to define arcs $c$ and $d$ in a manner as explained above in connection with Fig. 4. At the point of intersection of arcs $c$ and $d$ is the proper position for the axis of pivot pin 34 with respect to the axis of the swivel stud and adjustment shaft 40. Here, again, the longitudinal center line of the base will bisect the total angle of oscillation; or in this instance, as shown in Fig. 5, the fan oscillates 25 degrees either side of this center line.

As explained above in connection with Figs. 1 and 3, pivot pin 34 is affixed to adjusting arm 37, which in turn is rotatably adjustable about a pin 36. Now, if the layout of Fig. 4 is superimposed on the layout of Fig. 5, it is found that pivot pin 34 should occupy the position shown in full lines in Fig. 5 for minimum oscillation or the position 34a for maximum oscillation. Therefore, two points have been determined on an arc for the desired travel of pivot pin 34. The center for this arc, or in other words the axis of pin 36, may thus be selected on the perpendicular erected to bisect the chord of the arc connecting the two points. The actual position of the axis of pin 36 about which arm 37 rotates may be selected along this perpendicular to best suit the space available in view of the mechanical leverage required. The position of pin 36 likewise determines the length of the swivel stud arm to which it is fixed. Finally, cam arm 38 and its pivot pin 39 may be selected to provide the necessary turning moment for adjustment arm 37.

Obviously, once the arc of movement for pivot pin 34 has been determined, any reasonable number of intermediate positions of the pivot pin may be selected for varying the angles of oscillation of the fan. In each instance, the fan oscillates substantially the same amount either side of the given center line. When it is desired to change the angle of oscillation, this can readily and safely be done even during fan operation because the control knob 41 is concentric with the fixed swivel stud. Therefore, the knob does not swing in an arc and may be adjusted without stopping the fan motor.

In Figs. 6 and 7, I have shown an alternate form of an oscillating mechanism in combination with a clutch so that oscillation of the fan may be terminated and the fan may be locked in the desired position. For convenience, I have applied similar reference numerals to elements of this arrangement which may be common with the embodiment described in connection with Fig. 1 above. For example, the gear case 5a encloses the oscillating mechanism and also forms a frame for supporting bearings 14 and 15 which rotatably support motor shaft 16. Likewise, motor shaft 16 includes a worm 26 operatively engaging a worm wheel 27 to which is affixed a pinion 29 driving a spur gear shown in this embodiment as 48. In this embodiment as with Fig. 1 above, gear case 5a is rotatably carried on a swivel stud 49, which in turn is keyed to supporting arm 2. A suitable thrust bearing and grease seal 10 may be employed to permit free rotation of the gear case on the supporting arm and to prevent flow of lubricant from the gear case.

Fixed to the upper end of the swivel stud is a swivel stud arm 50, in this instance in the form of a gear segment. In meshing engagement with this gear segment is an oscillating arm or lever 51, also in the form of a gear segment. Oscillating arm 51 is pivotally mounted on a shaft 52, which likewise may serve as a shaft upon which worm gear 27 and pinion 29 rotate. With this arrangement, it may be seen that if oscillating arm 51 is driven backwardly and forwardly, its meshing engagement with the fixed gear segment 50 will cause oscillation of frame 5, since shaft 52 is fixed to the frame. For driving oscillating arm 51, I employ an eccentric driving connection from spur gear 48 including an eccentric arm or cam lever 53 pivotally connected to arm 51 by shouldered rivet 54. The opposite end of eccentric arm 53 has an annular portion 55 for cooperative engagement with an eccentric disk 56 carried on the upper end of a clutch shaft 57 extending coaxially through swivel stud 49. In the position of the component parts shown by Fig. 6, spur gear 48 is freely rotatable on clutch shaft 57, while the eccentric disk 56 is clamped against friction washer 59 and stud arm 50. Therefore, there will be no rotation of the eccentric disk and, hence, the oscillating mechanism will be inoperative. Friction washer 58 is placed between eccentric disk 56 and spur gear 48 and a similar friction washer 59 is placed between the underside of this disk and stud arm 50. Clutch shaft 57 is threaded as at 60 for threaded engagement with the eccentric disk; thus, if the knob is turned in one direction, the lower friction washer 59 and disk 56 are forced against the fixed swivel stud arm 50 to thereby lock the oscillating mechanism in a fixed position, as shown in Fig. 6. Whenever it is desired to have the oscillating mechanism operate, adjustment shaft 57 is rotated in the opposite direction, thus causing the threaded engagement between eccentric disk 56 and shaft 57 to force the upper friction washer and the disk into engagement with the undersurface of spur gear 48. Thereafter, the eccentric disk rotates with the spur gear, thus imparting an oscillatory motion to eccentric arm 53 and to oscillating arm 51 through shouldered rivet 54. Friction washer 58 is of suitable size and material so as to apply sufficient force to spur gear 48 to oscillate the fan, but will slip if oscillation is obstructed, thus protecting the motor from burning out.

To control the position of the clutch through adjustment shaft 57, I provide a knob 61 attached thereto by a screw 61a. Preferably, this knob has a cup shape so that it also functions to conceal the nut 7 which is employed to attach swivel stud 49 to the supporting arm 2. In addition, a grease seal washer 62 may be positioned on the lower end of the swivel stud to obviate grease leakage from the gear case. With the construction shown by Figs. 6 and 7, it may be seen that by rotation of knob 61, the operator of the fan can cause oscillation by locking the eccentric disk to the spur gear; or, the eccentric mechanism may be used to lock the fan in a given position by opposite rotation of the clutch knob.

In connection with Figs. 6 and 7, it may be noted that the oscillating mechanism was not adjustable to vary the angles of oscillation. In Figs. 8, 9 and 10, I have shown an embodiment of my invention which combines the oscillating mechanism of Figs. 1 and 3 with a clutch as shown by Figs. 6 and 7. Again, I have employed the same reference numerals for similar parts.

As with the previously described embodiment, I employ a clutch adjustment shaft 63 which is encircled by and coaxial with a swivel stud 64. Encircling the swivel stud and also coaxial therewith is an outer sleeve 65 for varying the angle of oscillation. As previously described, swivel stud 64 is keyed to supporting arm 2 and rotatably supports gear case and frame 5b with respect to the supporting arm. A suitable grease seal 66 may be employed at the point of connection of the swivel stud with the supporting arm. Affixed to the outer sleeve 65 is a knob 67 which is rotatable for adjusting the oscillation angle. To maintain this knob in preselected positions, I may employ a detent member 68 and compression spring 69, with the detent member cooperating with spaced indentations on supporting arm 2. The gear case and frame is rotatable with respect to outer sleeve 65 with a suitable thrust bearing and grease seal 70 positioned between the gear case and the upper surface of adjusting knob 67. As with the previously described embodiment, the lower end of clutch adjustment shaft 63 carries a knob 71 attached thereto by screw 72. Again, a suitable grease seal 73 may be employed to prevent flow of lubricant between the clutch adjustment shaft 63 and the inner surface of swivel stud 64.

In a manner similar to that described above, motor shaft 16 includes worm 26 driving a worm gear 27 and its associated pinion 29. Worm gear 27 and pinion 29 are freely rotatable on a shaft 74, which shaft extends downwardly into a recess 74a provided in the gear case. Pinion 29, in turn, drives spur gear 48, which is freely rotatable on the upper end of clutch adjustment shaft 63. Also, carried with a threaded engagement on the clutch adjustment shaft is an eccentric disk 56, as described in connection with Figs. 6 and 7. The clutch adjustment shaft, rotatable by knob 71, is effective through this threaded connection to move the eccentric disk upwardly into frictional engagement with spur gear 48 or downwardly away from the spur gear to terminate the oscillation drive and lock the fan in a selected position. In operative relation encircling the eccentric disk is the annular portion 55 of cam arm 53. As will be recalled from the above description, rotation of the eccentric disk when it is in engagement with spur gear 48 results in a reciprocatory motion of cam lever 53. The outer end of cam lever 53 is connected by a shouldered rivet 75 to a bell crank or upper rocker arm member 76. Arm 76 is integrally formed with sleeve 77 journaled on shaft 74 and a lower rocker arm 78 as a means for transmitting oscillatory motion from cam lever 53 to a link 79, which, in turn, is pivotally connected to arm 78 on one end and to shouldered rivet 80 at its opposite end. At this point, it may be noted that cam arm 53 functions and operates in substantially the same manner as oscillating lever 33 described in connection with Figs. 1 to 3 above. Shouldered rivet 80, in turn, serves substantially the same purpose as pin 34. Correspondingly, pin 34, during oscillation, is normally retained in a fixed position, as is the shouldered rivet 80. Therefore, the position of shouldered rivet 80 relative to the axis of the swivel stud determines the angle of oscillation as described in connection with Figs. 4 and 5.

The lever linkage for controlling the relative position of shouldered rivet 80 with respect to axis of the swivel stud may now be described. As shown in Figs. 8 and 10, shouldered rivet 80 is secured to an adjustment arm 81, in the form of a triangular plate. Adjustment arm 81 serves substantially the same function as adjustment arm 37 described above in connection with Figs. 1 to 3. As clearly shown in Fig. 10, a swivel stud arm 82 is fixed to the upper end of swivel stud 64. The outer end of the swivel stud arm carries a shouldered rivet 83 for a pivotal mounting of adjustment arm 81 with respect to the swivel stud arm. Thus, arm 81 is rotatable with respect to rivet 83. The relative angular position of arm 81 is controlled by an adjustment link 84 fixed to the upper end of adjustment shaft 65. Thus, rotation of knob 67 rotates the outer shaft 65 and adjustment link 84. This results in a pivotal movement of adjustment arm 81 about the axis of shouldered rivet 83. This pivotal movement changes the location of shouldered rivet 80 with respect to the axis of the swivel stud. With this construction, it may be seen that the layout of the oscillating mechanism described in connection with Figs. 4 and 5 may be used to locate the proper arc of travel of shouldered rivet 80, whereby the fan always oscillates an equal angle either side of a given center line. However, this construction has the added advantage over the arrangement illustrated by Fig. 1 in the provision of a clutch operable from a point external of the fan to engage or disengage the oscillating mechanism.

With all of the above constructions, I have included all of the moving parts within a gear case which may be sealed by a gear case cover, such as 85. Preferably, this gear case is an integral part of a frame for the fan, including the motor and its bearings, as disclosed in my copending application Serial No. 59,847 referred to above. With such an arrangement, a permanent supply of lubricant may be placed in the gear case, insuring proper lubrication not only of the speed reduction gears from the motor drive shaft, but also complete lubrication of all of the oscillating levers and pivot pins along with lubrication of the bearing surfaces between the swivel stud and frame. The use of my improved fan is facilitated since the operator need not consider the various directions the fan will take upon oscillation. Assuming, for example, that a fan base of rectangular configuration is employed, the fan user need only orient the base in the general direction in which air movement is desired. Thereafter, when the fan is operated, oscillation will take place in equal arcs either side of a center line passing through the base, and this is true regardless of the angle of oscillation selected. In addition, with the fan construction shown, the angle of oscillation can be changed either when the fan is running or when it has been turned off. Finally, I have provided an improved clutch mechanism operative in connection with such an oscillating mechanism permitting the operator to disengage the clutch at any time, either during fan operation or when it is at rest, with all of the components of the clutch mechanism sealed within the gear case.

The present invention has been described by reference to particular embodiments thereof. It is to be understood, however, that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In an electric fan including a fan driving motor and frame and a supporting means, an oscillating mechanism comprising a swivel stud fixed to the supporting means and oscillatably mounting the frame, a swivel stud arm fixed to said swivel stud, a rotatable member carried by the frame driven by the motor, an oscillating arm including eccentric connecting means with said rotatable member resulting in reciprocation thereof upon rotation of said member, a lever linkage pivotally connecting said oscillating arm with said swivel stud arm, and means including a control knob for selectively varying the relative position of the pivotal connection point between said oscillating arm and said swivel stud arm with respect to said swivel stud thereby to vary the angle of oscillation, said knob being located outside of said motor and frame, concentric with said swivel stud.

2. In an electric fan including a fan driving motor and frame and a supporting means, an oscillating mechanism comprising a swivel stud fixed to the supporting means and oscillatably mounting the frame, a swivel stud arm fixed to said swivel stud, a spur gear rotatably driven by the motor, an oscillating arm including eccentric connecting means with said spur gear resulting in reciprocation thereof upon spur gear rotation, a lever linkage having a first pivotal connection with said swivel stud arm and a second pivotal connection with said oscillating arm, and means including a control knob for manually adjusting said lever linkage to vary the position of said second pivotal connection thereby to vary the total angle of fan oscillation, said knob being located outside said motor and frame, concentric with said swivel stud.

3. In an electric fan including a fan driving motor and frame and a supporting means, an oscillating mechanism comprising a swivel stud fixed to the supporting means and oscillatably mounting the frame, a swivel stud arm fixed to said swivel stud, a spur gear rotatably driven by the motor, an oscillating arm including eccentric connecting means with said spur gear resulting in reciprocation thereof upon spur gear rotation, a lever linkage having a first pivotal connection with said swivel stud arm and a second pivotal connection with said oscillating arm, and adjusting means including a control knob external to said fan having a third pivotal connection with said lever linkage to vary the position of said second pivotal connection thereby to vary the total angle of the fan oscillation, said knob being located outside the motor and frame, concentric with said swivel stud.

4. An electric fan comprising fan driving means including a frame therefor, supporting means for said frame, a swivel stud fixed to said supporting means and oscillatably mounting said frame, a swivel stud arm fixed to said swivel stud, a spur gear rotated by said driving means, an oscillating arm including eccentric connecting means with said spur gear resulting in reciprocation thereof upon spur gear rotation, clutch means for selectively controlling the operative engagement between said spur gear and said eccentric connecting means, a control knob for said clutch means located outside of said frame, concentric with said swivel stud, a lever linkage pivotally connecting said oscillating arm with said swivel stud arm, and means including a second knob for selectively varying the relative position of the pivotal connection between said oscillating arm and said swivel stud arm with respect to said swivel stud thereby to vary the angle of oscillation, said second knob also being located outside of said frame concentric with said swivel stud.

5. In an electric fan including a fan driving motor and frame and a supporting means, an oscillating mechanism comprising a swivel stud fixed to the supporting means and oscillatably mounting the frame, a swivel stud arm fixed to said swivel stud, a spur gear rotatably driven by the motor, an oscillating arm including eccentric connecting means with said spur gear resulting in reciprocation thereof upon spur gear rotation, a lever linkage having a first pivotal connection with said swivel stud arm and a second pivotal connection with said oscillating arm and means including a control knob for manually adjusting said lever linkage to vary the relative position of said second pivotal connection with respect to said swivel stud thereby to vary the total angle of fan oscillation, said knob being located outside the motor and frame concentric with said swivel stud.

6. An electric fan comprising fan driving means including a frame therefor, supporting means for said frame, a swivel stud fixed to said supporting means and oscillatably mounting said frame, a swivel stud arm fixed to said swivel stud, a spur gear rotated by said driving means, an oscillating arm including eccentric connecting means with said spur gear resulting in reciprocation thereof upon spur gear rotation, clutch means for selectively controlling the operative engagement between said spur gear and said eccentric connecting means, a control knob for said clutch means located outside of said frame, concentric with said swivel stud, a lever linkage pivotally connecting said oscillating arm with said swivel stud arm, and manually adjustable means including a second control knob external to said fan having a pivotal connection with said lever linkage to vary the relative position of the pivotal connection between said oscillating arm and said swivel stud arm thereby to vary the angle of oscillation said second knob also being concentric with said swivel stud.

7. A variable oscillating mechanism for an electric fan having a driving motor comprising a spur gear, a gear reduction from the driving motor to said spur gear, oscillating lever means having a pivotal connection eccentrically to said spur gear, a support means providing a second pivotal connection point for said oscillating lever, a swivel stud about which said fan oscillates, and means including a control knob movable from an external point on said fan for shifting the relative position of said second pivotal connection with respect to said swivel stud, said knob being concentric with said swivel stud.

8. A variable oscillating mechanism for an electric fan having a driving motor comprising a spur gear, a fan support means, a gear reduction from the driving motor to said spur gear, oscillating lever means having a pivotal connection eccentrically to said spur gear and a second pivotal connection with said support means, a swivel stud about which said fan oscillates, and means movable from an external point on said fan for shifting the relative position of said second pivotal connection with respect to said swivel stud, said movable means including an adjusting shaft extending coaxially through said swivel stud and rotatable with respect thereto, a control knob fixed on said shaft for adjusting the position of said shaft, and a lever linkage movable by said shaft for adjusting the position of said second pivotal connection with respect to said swivel stud.

9. In an electric fan including a fan driving motor and frame and a supporting means, an oscillating mechanism comprising a swivel stud fixed to the supporting means and oscillatably mounting the frame, a swivel stud arm fixed to said swivel stud, a rotatable member carried by the frame driven by the motor, an oscillating arm including eccentric connecting means with said rotatable member resulting in reciprocation thereof upon rotation of said member, a lever linkage pivotally connecting said oscillating arm with said swivel stud arm, and means including a control knob for selectively varying the relative position of the pivotal connection point between said oscillating arm and said linkage with respect to said swivel stud thereby to vary the angle of oscillation, said control knob being located outside the motor and frame concentric with said swivel stud, said pivotal connection point having an arc of travel upon adjustment of said linkage for fan oscillation in substantially equal arcs in each direction from a given longitudinal center line.

10. In an electric fan including a fan driving motor and frame and a supporting means, an oscillating mechanism comprising a swivel stud fixed to the supporting means and oscillatably mounting the frame, a swivel stud arm fixed to said swivel stud, a spur gear rotatably driven by the motor, an oscillating arm including eccentric connecting means with said spur gear resulting in reciprocation thereof upon spur gear rotation, a lever linkage having a first pivotal connection with said swivel stud arm and a second pivotal connection with said oscillating arm, and adjusting means including a control knob external to said fan having a third pivotal connection with said lever linkage to vary the position of said second pivotal connection thereby to vary the total angle of the fan oscillation, said knob being concentric with said swivel stud, and means selectively locking said adjusting means in one of a plurality of fixed positions.

11. In an electric fan including a fan driving motor and frame and a supporting means, an oscillating mechanism comprising a swivel stud fixed to the supporting means and oscillatably mounting the frame, a swivel stud arm fixed to said swivel stud, a rotatable member carried by the frame driven by the motor, an oscillating arm including eccentric connecting means with said rotatable member resulting in reciprocation thereof upon rotation of said member, a lever linkage pivotally connecting said oscillating arm with said swivel stud arm, manually adjustable means including a control knob for selectively varying the relative position of the pivotal connection point between said oscillating arm and said swivel stud arm with respect to said swivel stud, said knob being outside said motor and frame, concentric with said swivel stud, and means locking said manually adjustable means in one of a plurality of fixed positions.

12. An electric fan comprising a fan driving motor and frame, a supporting means, a swivel stud fixed to the supporting means and swivelly mounting said fan driving motor and frame with respect thereto, a swivel stud arm fixed to said swivel stud, an adjusting shaft extending coaxially through said swivel stud and rotatable with respect thereto, a cam lever fixed to an end of said adjusting shaft adjacent the oscillating mechanism, an adjusting knob on the opposite end of said shaft externally of the fan, an adjusting arm pivotally carried by said swivel stud arm and linked with said cam lever with a lost motion connection and adapted to be rotated by said cam lever, a spur gear rotatably driven from the fan drive and carried by the frame, and an oscillating lever having a pivotal connection at one end eccentrically of said spur gear and a second pivotal connection at its opposite end with said adjusting arm.

13. In an electric fan including a fan driving motor and frame and a supporting means, an oscillating mechanism for moving the fan frame with respect to the supporting means comprising a swivel stud fixed to the supporting means and pivotally carrying the fan frame, a gear segment fixed to said swivel stud, a meshing gear segment pivotally carried by the frame for oscillatory motion, an oscillating lever pivotally connected to said meshing gear segment, a spur gear rotated by said motor, an eccentric connection means between said oscillating lever and said spur gear to reciprocate said lever upon rotation of said gear, clutch means operative selectively to engage or disengage said eccentric connection and a control knob for said clutch means located outside of said motor and frame concentric with said swivel stud.

14. An electric fan comprising a fan driving motor and frame, a supporting means, a swivel stud fixed to the supporting means and swivelly mounting said fan driving motor and frame with respect thereto, a swivel stud arm fixed to said swivel stud, an adjusting shaft extending coaxially through said swivel stud and rotatable with respect thereto, a cam lever fixed to an end of said adjusting shaft adjacent the oscillating mechanism, an adjusting knob on the opposite end of said shaft externally of the fan, an adjusting arm pivotally carried by said swivel stud arm and linked with said cam lever with a lost motion connection and adapted to be rotated by said cam lever, a spur gear rotatably driven from the fan drive and carried by the frame, an oscillating lever having a pivotal connection adjacent one end eccentrically of said spur gear and a second pivotal connection adjacent its opposite end with said adjusting arm, and locking means selectively engageable to fix the rotary position of said cam lever for maximum and minimum angles of oscillation in equal arcs in each direction from a given longitudinal center line.

15. In an electric fan including a fan driving motor and frame and a supporting means, an adjustable oscillating mechanism for varying the angle of oscillation with respect to the center line of the supporting means comprising a swivel stud interconnecting the motor frame and support and on which the motor oscillates with respect to the support, a swivel stud arm fixed to said swivel stud, an adjusting shaft extending coaxially through said swivel stud and rotatable with respect thereto, a cam lever fixed to an end of said adjusting shaft adjacent the oscillating mechanism, an adjustment knob on the opposite end of said shaft at a point external of the fan frame, an adjusting arm pivotally carried by said swivel stud arm and linked with said cam lever with a lost motion connection and adapted to be rotated by said cam lever, a spur gear rotatably driven from the fan drive and carried by the frame, an oscillating lever having a pivotal connection at one end eccentrically of said spur gear and a second pivotal connection at its opposite end with said adjusting arm, said second pivotal connection being located to provide equal angles of oscillation with respect to the center line, and means selectively locking said adjusting shaft in one of a plurality of fixed positions.

16. In an electric fan including a fan driving motor and frame and a supporting means, an oscillating mechanism comprising a swivel stud fixed to the supporting means and oscillatably mounting the frame, a swivel stud arm fixed to said swivel stud, a rotatable member carried by the frame, driven by the motor, an oscillating arm including eccentric connecting means with said rotatable member resulting in reciprocation thereof upon rotation of said member, a lever linkage normally pivotally connecting said oscillating arm with said swivel stud arm, and means for selectively varying the connections from said rotatable member through said oscillating arm and linkage to said swivel stud arm to effect altered oscillating driving conditions between said rotatable member and said fixed swivel stud, said means for selectively varying the connections including a control knob located outside of said motor and frame concentric with said swivel stud.

17. A variable oscillating mechanism for an electric fan having a driving motor comprising a spur gear, a fan support means, a gear reduction from the driving motor to said spur gear, oscillating lever means having a pivotal connection eccentrically to said spur gear, and a second pivotal connection with said support means, a swivel stud about which said fan oscillates, and means movable from an external point on said fan for adjusting the connection between said spur gear and said swivel stud, said movable means including an adjusting shaft extending coaxially through said swivel stud and rotatable with respect thereto, a control knob fixed on said shaft for adjusting the position of said shaft, and means movable by said shaft for altering the driving connection between said spur gear and said swivel stud.

GEORGE J. REISCH.

References Cited in the file of this patent

UNITED STATES PATENTS

| Number | Name | Date |
|---|---|---|
| 961,703 | Lipps | June 14, 1910 |
| 1,005,429 | Hollander et al. | Oct. 10, 1911 |
| 1,115,147 | Zabriskie | Oct. 27, 1914 |
| 1,258,478 | Shaw et al. | Mar. 5, 1918 |
| 1,403,151 | Diehl | Jan. 10, 1922 |